July 31, 1928.
C. P. BERG
1,679,149
PROCESS OF HYDRATING LIME
Filed Feb. 8, 1926    5 Sheets-Sheet 1
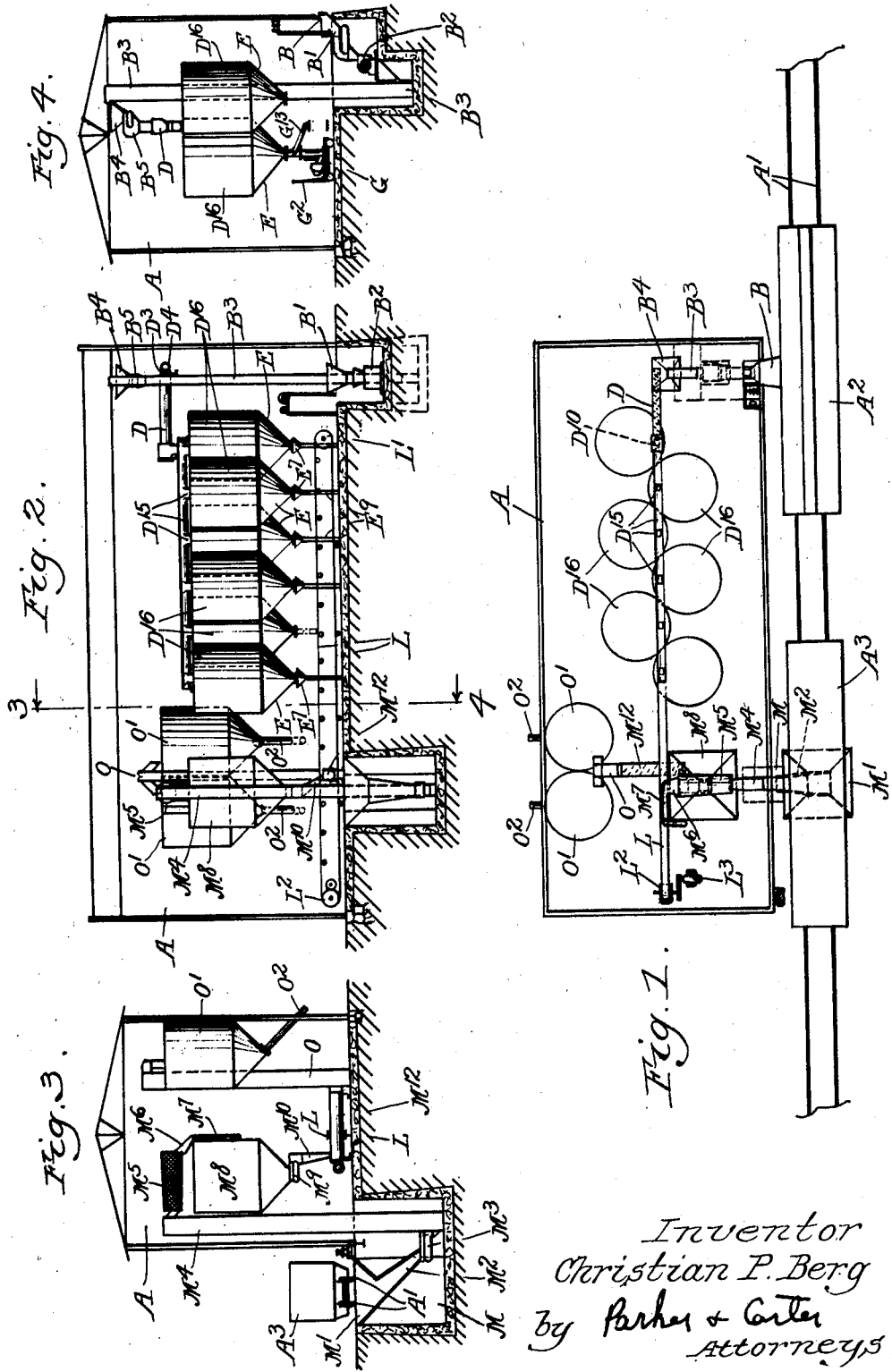
Inventor
Christian P. Berg
by Parker & Carter
Attorneys July 31, 1928.
C. P. BERG
1,679,149
PROCESS OF HYDRATING LIME
Filed Feb. 8, 1926  5 Sheets-Sheet 2
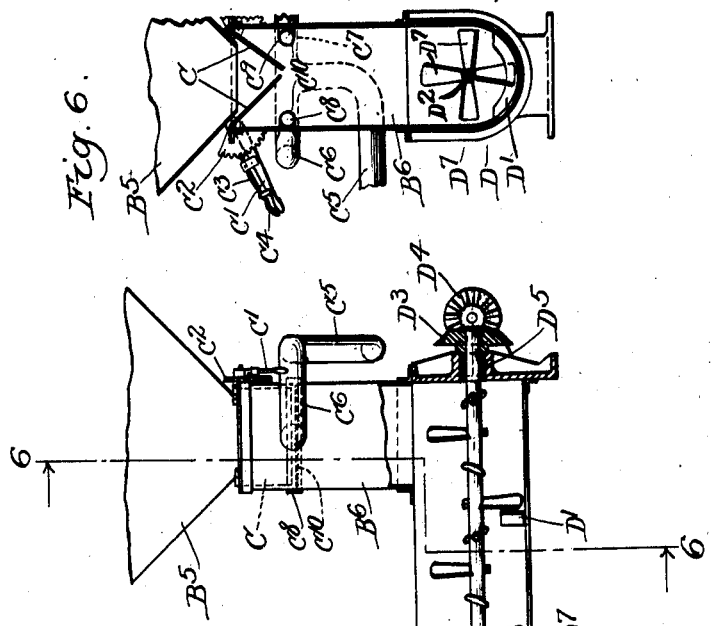
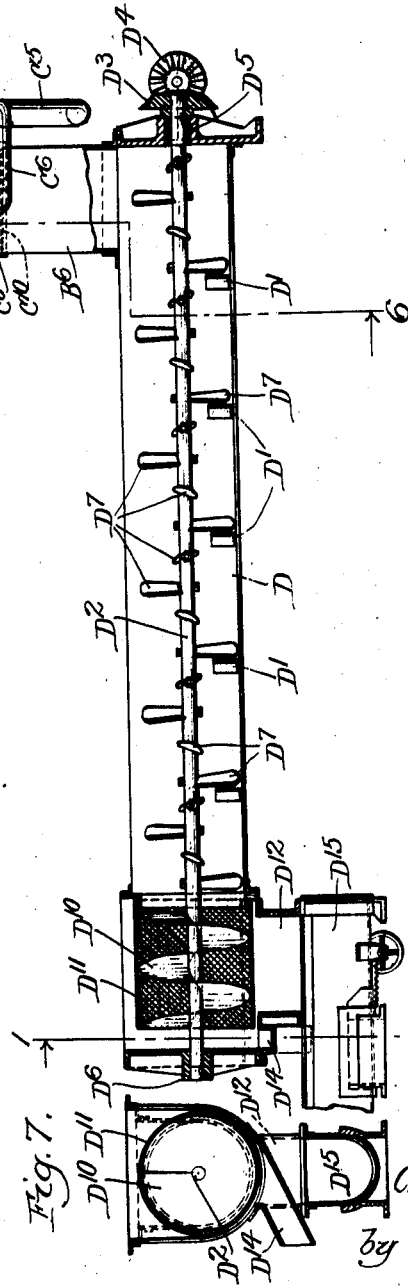
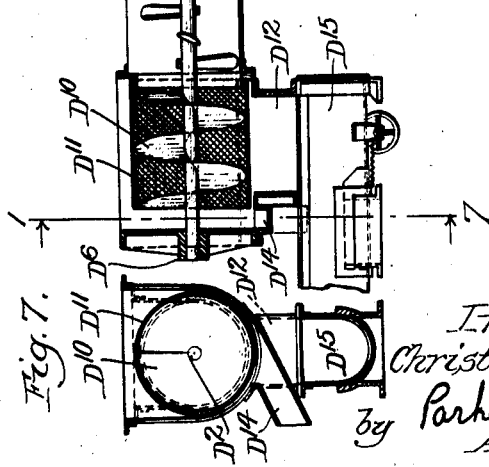
Inventor
Christian P. Berg
by Parker & Carter
Attorneys.

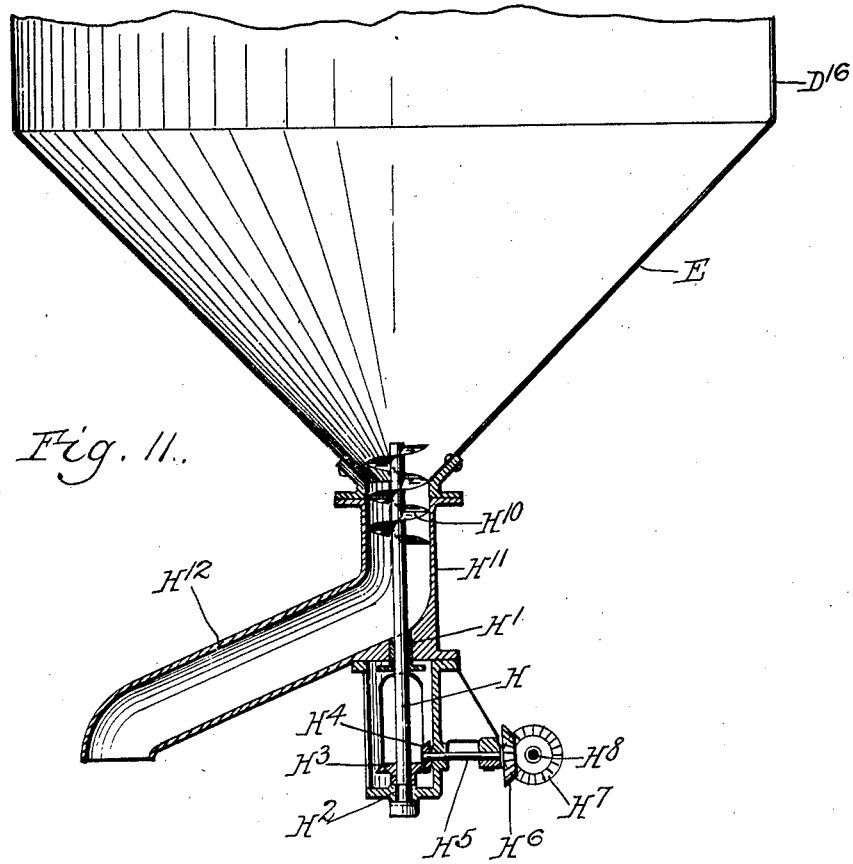
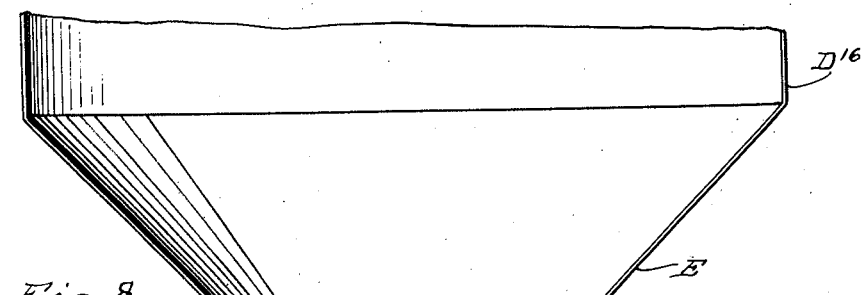

July 31, 1928.
C. P. BERG
1,679,149
PROCESS OF HYDRATING LIME
Filed Feb. 8, 1926
5 Sheets-Sheet 4
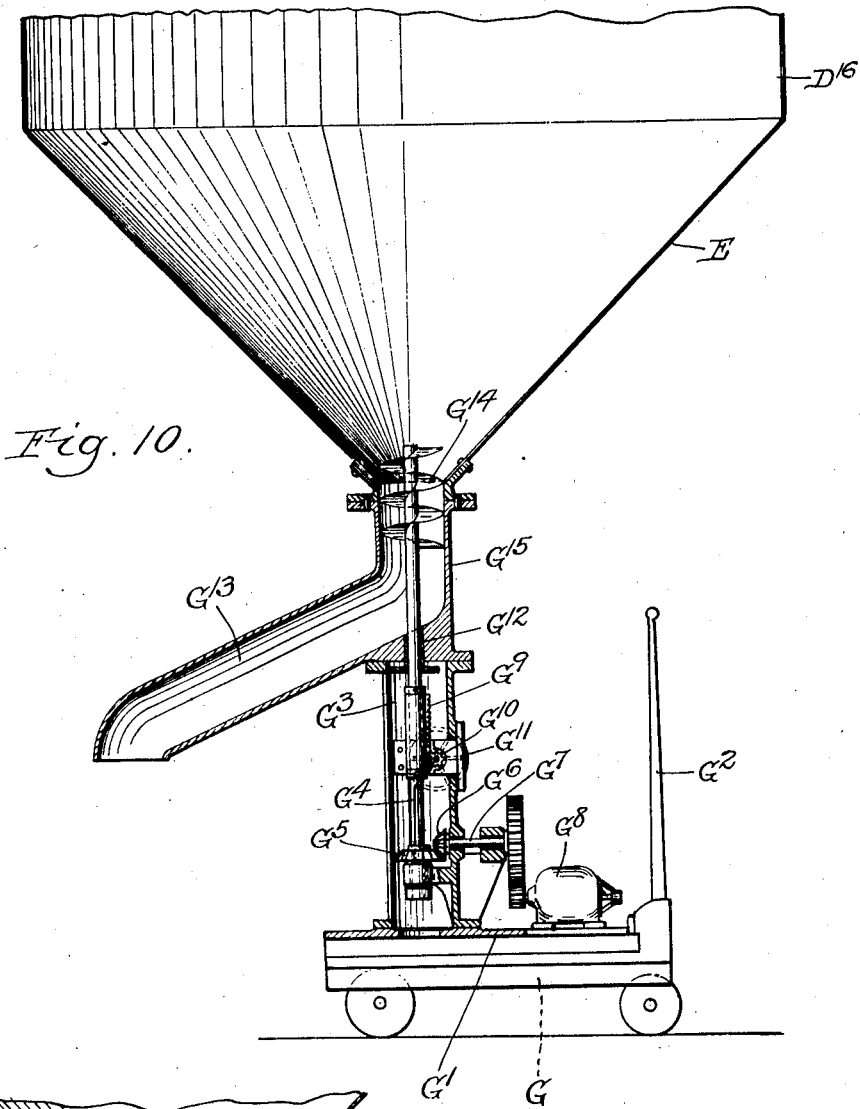
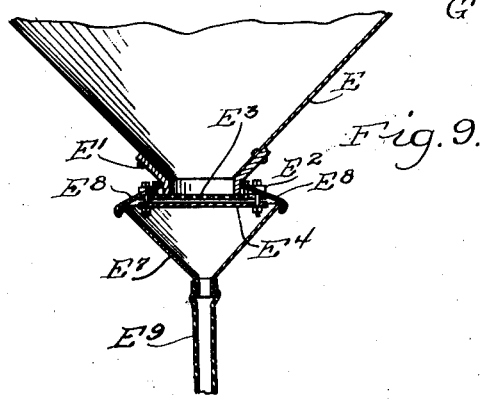
Inventor
Christian P. Berg.
by Parker & Carter
Attorneys.

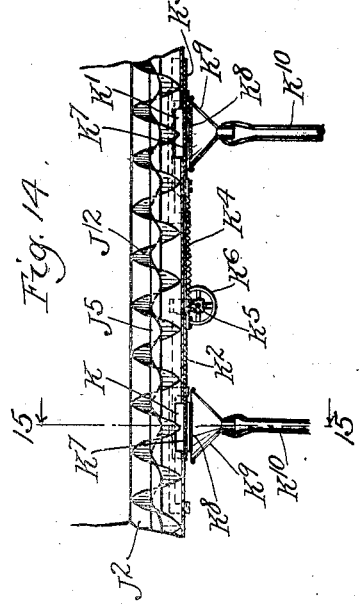

Patented July 31, 1928.

1,679,149

UNITED STATES PATENT OFFICE.

CHRISTIAN P. BERG, OF CHICAGO, ILLINOIS.

PROCESS OF HYDRATING LIME.

Application filed February 8, 1926. Serial No. 86,700.

My invention relates to an improvement in a method of preparing hydrated lime. It has for one object to provide a method for slaking lime and purifying the slaked lime. Another object is the provision of a method of preparing and storing ready mixed mortar. Other objects will appear from time to time in the course of the specification and claims.

I illustrate my invention more or less diagrammatically in the accompanying drawings, wherein—

Figure 1 is a plan view of my installation;

Figure 2 is a side elevation;

Figure 3 is a section on the line 3—4 of Figure 2, looking in the direction of the arrows;

Figure 4 is a section on the line 3—4 of Figure 2, looking in the opposite direction;

Figure 5 is an enlarged side view of the lime and water mixing or slaking apparatus;

Figure 6 is a section on the line 6—6 of Figure 5;

Figure 7 is a section on the line 7—7 of Figure 5;

Figure 8 is a vertical section, on an enlarged scale, through the bottom of one of the storage tanks shown in Figure 2;

Figure 9 is a similar section through the bottom of one of such tanks, during drainage;

Figure 10 is a similar section through one of such tanks during the discharge of the slaked lime or putty therefrom;

Figure 11 is a similar view through a variant form;

Figure 12 is a longitudinal vertical section through the bottom of a variant form of tank;

Figure 13 is a section on the line 13—13 of Figure 12;

Figure 14 is a detail of Figure 12 with the parts in a different position; and

Figure 15 is a section on the line 15—15 of Figure 14.

Like parts are indicated by like figures throughout the specification and drawings.

Referring particularly to Figures 1 to 4, my apparatus may be housed in any suitable enclosing structure A and is preferably positioned adjacent railroad tracks $A^1$ upon which may be spotted the cars $A^2$, $A^3$. Referring to Figure 4 the lime may be delivered from the car $A^2$ along any suitable chute B to the apron conveyor feeder $B^1$, which in turn delivers the material for crushing, for example to the hammer mill crusher $B^2$. It will be understood that the details of chute, conveyor and crusher form no part of the present invention and are therefore not described in detail. The crushed lime passing from the hammer mill is received by any suitable conveyor, for example the bucket conveyor $B^3$, which discharges to any suitable hopper $B^4$ and thus to the apron feeder $B^5$.

Referring to Figures 5 and 6, the passage of material from the feeder $B^5$ to the mixing chamber $B^6$ is controlled by the adjustable vanes C, C, the angle of which may be varied by means of any suitable levers $C^1$ movable about toothed segments $C^2$, each provided with any suitable tooth engaging member $C^3$ controlled by the hand lever $C^4$ in association with the hand lever $C^1$. It will be understood that the individual vanes C may thus be independently controlled. $C^5$ is any suitable water line, having the branches $C^6$ $C^7$ extending to opposite sides of the mixing chamber $B^6$. Each such branch is in communication with one of the transverse interior water pipes $C^8$ $C^9$, the pipes being slotted longitudinally, as at $C^{10}$, to project a generally continuous sheet of water into the interior of the mixing chamber. The water sheets so delivered preferably incline somewhat downwardly, and converge.

It will be understood that in general use the vanes C are so adjusted as to direct the flow of a sheet or stream of the finely divided lime to a point slightly to one side of the convergence of the two sheets of water.

The finer particles are instantly mixed with the water thus delivered, but some further emersion and separation is necessary for the larger lime particles. The mixed mass flows or drops into the longitudinal mixing chamber D, of generally cylindrical cross-section. The bottom is provided with a plurality of spaced baffles or obstructions $D^1$. $D^2$ is a longitudinal shaft driven from any suitable power source, through the bevel gears $D^3$ $D^4$ mounted in the bearings $D^5$ $D^6$. It is provided with a plurality of paddles $D^7$, one of such paddles being positioned to pass in close proximity to each of the baffles $D^1$, the angle or shape of the paddle being such as to adapt it to dig or plough out the material gathered against the baffle, as the mass undergoing mixture flows or circulates from right to left, as shown in Figure 5.

At the left end of the shaft, as shown in such figure, is positioned a spiral $D^{10}$ of sheet metal, surrounded by a cylindrical screen $D^{11}$. $D^{12}$ is an opening or passage beneath the screen along which the screened material may pass or flow. $D^{14}$ is a discharge chute for such coarse material as fails to pass through the screen but is thrust beyond it by rotation of the spiral $D^{10}$. This material may be discharged in any suitable manner. The slaked and screened lime or milk may flow or be conveyed in any suitable manner along the passages $D^{15}$ to the various curing tanks $D^{16}$.

Referring to Figures 8, 9 and 10, each curing tank $D^{16}$ terminates at its bottom in a conic funnel portion E, secured to the apex of which is a lip member $E^1$ provided with an outwardly extending flange $E^2$. $E^3$ is a perforated plate and $E^4$ a solid plate, the two plates being bolted to the flange $E^2$ for example by the bolts $E^5$ and $E^6$.

During the filling of the curing tanks the slotted plate $E^4$ is drawn up in position against the perforated plate $E^3$, as shown in Figure 8, to prevent the escape of the inflowing material. During the drainage or settling or curing of the lime or milk in the tanks I release the slotted plate, and, as shown in Figure 9, position it slightly below the perforated plate. I then secure beneath the plates any suitable funnel member $E^7$, for example by the wire fasteners $E^8$ and deliver the water which flows through the perforated plate and into the funnel along any suitable tube $E^9$, for example to the floor drains.

When I wish to discharge the cured lime or putty I remove both the slotted and the perforated plates and center beneath the hopper the structure shown in Figure 10. G is any suitable lift truck the working top $G^1$ of which may be raised or lowered by manipulation of the lever $G^2$. It will be understood that the lift truck forms per se no part of the present invention and is therefore not indicated or described in detail. Such truck, as used in my apparatus and process, carries the vertical standard or tower $G^3$, in which is mounted the shaft $G^4$ upon which is splined the bevel gear $G^5$ in mesh with the gear $G^6$ on the shaft $G^7$ adapted to be rotated by the motor $G^8$. The shaft $G^4$ is provided with a rack $G^9$ in mesh with the pinion $G^{10}$ controlled for example by the hand wheel $G^{11}$. Its upper end passes through the bearing $G^{12}$ in the spout member $G^{13}$ and carries a spiral or worm member $G^{14}$. It will be understood that the manipulation of the hand wheel $G^{11}$ raises or lowers such worm $G^{14}$ in relation to the upper spout section $G^{15}$ in which it is housed.

Figure 11 illustrates a variant form in which the discharge spout is permanently associated with the hopper. In such case the shaft H is supported in the bearings $H^1$ $H^2$ and is rotated for example through the gears $H^3$ $H^4$, the shaft $H^5$, the gears $H^6$ $H^7$ from any suitable shaft $H^8$ in communication with a power source not herein shown. The worm or spiral $H^{10}$ at the upper end of the shaft H is permanently positioned, within the upper portion $H^{11}$ of the spout casing, the material being downwardly discharged through the spout member $H^{12}$.

Figures 12 to 15 inclusive illustrate a variant form of curing hopper J including the converging plane bottom panels $J^1$. The space between them is occupied by a conveyor trough $J^2$ the bottom of which is of semicircular cross-section. At one end it is provided with a downwardly turned spout member $J^3$ which may be closed by the removable panel $J^4$ during the filling and curing. Positioned in the conveyor trough is the shaft $J^5$ mounted in the bearings $J^6$ $J^7$ and rotated through the gear $J^8$ from any source of power not herein shown. The shaft carries a worm or spiral conveyor $J^{12}$ which terminates beyond the bottom of the tank adjacent the downwardly turned spout portion $J^3$.

The bottom of the conveyor trough is provided with drainage apertures K $K^1$ which may be closed by the slides $K^2$ $K^3$ controlled by the rack $K^4$, the pinion $K^5$, and the hand wheel $K^6$. Controlled by the same rack and pinion are the drainage units each consisting of the perforated plate $K^7$ and the solid plate $K^8$ spaced slightly therebeneath. Associated with each unit is the funnel $K^9$ and the drainage water line $K^{10}$.

Referring to Figures 2 to 4 inclusive, L is any suitable endless conveyor, passing for example about the pulleys $L^1$ $L^2$, and driven for example by the motor $L^3$. The putty may be discharged from the spouts shown in Figures 10, 11 and 12, upon such conveyor L for disposal, as below described. Referring particularly to Figure 3, a sand car $A^3$, on the tracks $A^1$, may be spotted over any suitable loading pit M, discharged into the hopper $M^1$ and through the chute $M^2$ to the feeder $M^3$ which discharges to any suitable conveyor or bucket elevator $M^4$. The sand is delivered thence to the rotary screen $M^5$, the over-size passing beyond the screen for disposal along the chute $M^6$ and the passage $M^7$. The material passing through the screen is received in the sand storage tank $M^8$ and is delivered thence through the feeder $M^9$ and the spout $M^{10}$ to any suitable mixer $M^{12}$, the details of the particular mixer employed forming no part of the present invention. The lime putty passing along the conveyor L is discharged into such mixer $M^{12}$ for mixing with the inflowing sand. The mixture is discharged, as shown in Figure 3, from the right end of the mixer $M^{12}$ to any suitable conveyor for example the bucket elevator O which discharges the mixed material to the storage tank or tanks $O^1$, whence it may be withdrawn, as needed, through the spouts $O^2$.

It will be realized that whereas I have described and shown a practical and operative device, that nevertheless many changes might be made in the size, shape, number and disposition of parts without departing from the spirit of my invention and that I wish my description and drawings to be taken as in a broad sense illustrative or diagrammatic rather than as limiting me to the particular description and drawings herein employed.

The use and operation of my invention are as follows:

Referring to Figures 1 and 2, the lime car $A^2$ delivers lime along the chute B through the conveyor $B^1$, through the hammer mill or crusher $B^2$ and by means of the vertical conveyor $B^3$ to the hopper $B^4$ and through the feeder $B^5$. The lime, relatively finely divided by its passage through the hammer mill $B^2$, is directed by the adjustable vanes C into the mixing chamber $B^6$.

Along each side of such chamber are the longitudinally slotted water pipes $C^7$ $C^8$ which project downwardly and inwardly inclined and converging sheets of water into the mixing chamber. The vanes C are preferably but not necessarily, so positioned as to deliver a relatively thin sheet of lime into the one or the other of the two sheets of water at a point somewhat removed from the convergence of the two sheets. The finely divided particles, suspended in air and more or less separated, are thus subjected to thin, rapidly moving sheets of water, and are readily wetted. The mixture is further effected by the agitation resulting from the contact of the converging sheets of water. In practice the finer particles are substantially all wetted down and the coarser particles are at least externally subjected to the water.

The mixed liquid or paste so formed drops to the bottom of the right end of the conveyor D and is subjected to the agitating and conveying movement of the inclined faced paddles $D^7$. The larger, heavier particles naturally gravitate to the bottom of the mass and as the mass moves to the left they bank up against the low baffles $D^1$. One of the paddles $D^7$ is positioned on the receiving side of each of the baffles and plows out and further mixes the mass of partially slaked or unslaked larger particles there gathered. The result is a very complete mixing or slaking of the lime.

The mixture, at the end of its travel along the conveyor trough D, is passed by the spiral $D^{10}$ across the screen $D^{11}$. All the liquefied or finely divided material flows through the screen and only the oversized lumps pass over the screen to the discharge chute $D^{14}$. The mixture flows or is conveyed along the passage $D^{15}$ to one of the various curing tanks $D^{16}$.

Referring to Figure 8, when the curing tanks are initially filled the solid plate $D^4$ is drawn up against the drainage plate $D^3$ to prevent leakage. When the tank is finally filled, containing any suitable ratio of water and lime, the funnel $E^7$ is positioned beneath the apex of the tank and the solid plate $E^4$ is lowered a slight distance, for example to one-fourth to one-half inch, below the perforated plate $E^3$. The mixed mass of lime pours through the apertures but does not spread laterally, each aperture having issuing from it a column of lime or putty through which flows water from the interior of the tank. This water, as it flows through the tank, is clear and without any perceptible admixture of lime.

I may satisfy myself with simply draining from the tank the superfluous water but I prefer to introduce further clear water into the top of the tank and to filter it through the lime contained therein. The result is a further curing or bleaching of the lime, and the putty so formed is not only a clear white but is richer and more adhesive than ordinary lime putty.

The putty so formed is too thick to flow freely and I therefore employ positively driven mechanical means for withdrawing it. Referring to Figure 10, I remove both the solid and the perforated plates $E^3$ and $E^4$ and position beneath the apex of the tank the spout discharge member $G^{13}$ $G^{15}$. Positioned within the vertical portion $G^{15}$ is the worm or spiral $G^{14}$, which is motor driven. The spiral conforms in diameter to the diameter of the spout, and, as soon as it is filled, the putty acts as an air lock to prevent the passage of air through the spiral. The spiral is raised, for example by the rack $G^9$ and the pinion $G^{10}$, above the upper end of the vertical portion $G^{15}$, and actually penetrates the interior of the apex of the tank. As it rotates, it positively conveys downwardly a volume of putty. The suction so created draws additional putty down toward the upper end of the spiral and the increment of the putty positively downwardly moved by the spiral sets up a pressure which downwardly forces a column of putty in the spout $D^{13}$, positively discharging it.

Figure 11 shows a variant form of my device in which the spiral $H^{10}$ is permanently fixed in the position there shown.

Figures 12 to 15 illustrate a further modification of the form of the storage tank and discharge member.

Whatever the specific form of tank and discharge means employed, I prefer, as shown in Figures 1 and 2, to discharge the cured putty upon a conveying means adapted to receive putty from a number of curing tanks, but I do not wish to be limited to this procedure. In the mechanism shown, putty from the storage tanks $D^{16}$ is discharged to the horizontal conveyor L and is thence discharged, in any suitable manner, to the mixing member $M^{12}$. There it is mixed with sand, coming for example from the sand car $A^3$.

Such sand flows through the hopper $M^1$, the chute $M^2$, the apron feed $M^3$, the vertical conveyor $M^4$ and the screen $M^5$ to the sand storage container $M^8$. It is thence delivered by the feed $M^9$ and the chute $M^{10}$ to the above mentioned mixer $M^{12}$. The said mixture delivers to the vertical conveyor O mixed lime putty mortar in condition for use. This mortar is delivered by the said vertical conveyor to the storage tanks $O^1$ whence it may be withdrawn, as desired, along the spouts $O^2$.

I claim:

1. The method of hydrating lime which consists in dropping relatively finely divided lime through converging sheets of water, agitating the mixture so formed to break up and slake the larger particles of lime, holding the mixture so formed in a curing zone, draining the water from such mixture and passing additional water through the mixture in such storage zone.

2. The method of hydrating lime which includes mixing lime and water, holding the mixture so formed in a curing zone, draining from the mixture a substantial proportion of the water therein contained and passing through the mixture additional volumes of water, and taking off the putty so cured.

3. The method of hydrating lime which includes passing relatively finely divided lime through a sheet of water, holding the mixture so formed in a curing zone, draining from the mixture a substantial proportion of the water therein contained, and passing through the mixture additional volumes of water.

4. The method of hydrating lime which includes passing relatively finely divided lime through a sheet of water, holding the mixture so formed in a curing zone, draining from the mixture a substantial proportion of the water therein contained, passing through the mixture additional volumes of water, taking off the putty so cured.

5. The method of curing lime putty which includes the mixing of lime and water, the holding of the mixture in a curing zone, the drainage of such mixture, and the employment of depending extensions of such mixture as drainage wicks.

6. The method of curing lime putty which includes the mixing of lime and water, the holding of the mixture in a curing zone, the drainage of such mixture, the passage of additional volumes of water through such mixture, and the employment of depending extensions of such mixture as drainage wicks.

7. The method of hydrating lime which includes delivering lime and water to a mixing zone and there mixing them, delivering the mixture so formed to a curing zone, draining from the mixture a proportion of the water therein contained, and passing additional water through the mixture.

8. The method of hydrating lime which includes mixing lime and water, holding the mixture so formed in a curing zone, draining from the mixture a substantial proportion of the water therein contained, passing through the mixture additional volumes of water, and taking off from the lower portion of the curing zone the mixture so formed and cured.

9. The method of hydrating lime which includes mixing lime and water, delivering the mixture so formed into the upper portion of a curing zone, permitting it to move downwardly by gravity through such curing zone, and taking off from the bottom of said curing zone the mixture so formed and cured.

10. The method of hydrating lime which includes mixing lime and water, delivering the mixture so formed into the upper portion of a curing zone, permitting it to move downwardly by gravity through such curing zone, draining from the mixture a substantial proportion of the water therein contained, and taking off from the bottom of said curing zone the mixture so formed and cured.

11. The method of hydrating lime which includes mixing lime and water, delivering the mixture so formed into the upper portion of a curing zone, permitting it to move downwardly by gravity through such curing zone, draining from the mixture a substantial proportion of the water therein contained, and passing through the mixture additional volumes of water, and taking off from the bottom of said curing zone the mixture so formed and cured.

Signed at Chicago county of Cook and State of Illinois, this 4th day of February, 1926.

CHRISTIAN P. BERG.